3,361,738
ERYTHROMYCIN PHOSPHATE AND
PHOSPHITE ESTERS
Peter H. Jones, Lake Forest, Ill., and Elizabeth A. Rowley, Green Lake, Wis., assignors to Abbott Laboratories, North Chicago, Ill., a corporation of Illinois
No Drawing. Filed Apr. 18, 1966, Ser. No. 543,046
10 Claims. (Cl. 260—210)

The present invention relates generally to novel therapeutic compounds and more specifically to new phosphate and phosphite ester derivatives of erythromycin.

The above esters have good activity both in vitro and in vivo against bacteria normally sensitive to erythromycin. They are non-toxic and, in comparison to previously-known derivatives of erythromycin, the dihydrogen phosphate and hydrogen phosphite ester derivatives particularly, are very water soluble (2% and 5%, respectively). Additionally, these acidic esters may be complexed with bases such as procaine to lessen the pain upon injection and/or to change the solubility for absorption characteristics. It is noted that the acidic esters are zwitterions which may account for their increased water solubility. These properties make the compounds ideally suitable for intramuscular administration by means of a hypodermic needle and the like.

The novel compounds of the present invention can be represented by the following formula:

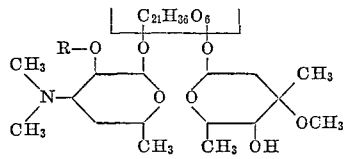

in which R represents hydrogen phosphite, loweralkyl phosphite, aryl phosphite, dihydrogen phosphate, diloweralkyl phosphate, and diaryl phosphate. For convenience, the erythromycin molecule has been simplified in comparison to the complete formula as set forth in J. Am. Chem. Soc. 77, 3677 (1955); 78, 388, 308 (1956). In the foregoing description, the term "loweralkyl" includes alkyl radicals containing from 1 to 4 carbon atoms, and "aryl" includes the benzyl, phenyl, and naphthyl radicals.

In general, the novel compounds of the present invention are prepared by treating a solution of the corresponding phosphate or phosphite and erythromycin A with dicyclohexylcarbodiimide or by treatment of erythromycin A with the corresponding phosphorochloridate in the presence of triethylamine.

The following specific examples are for the purpose of illustrating the preferred form of the present invention and are not intended to limit the invention to the precise proportions or reactants used therewith or products produced thereby.

Example 1.—Erythromycin A—2'-(benzyl phosphite)

R = 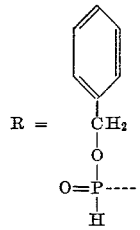

Ammonium monobenzyl phosphite [0.95 g. (.005 mole)], prepared by the method of Baddily et al. J. Chem. Soc. (1949), 815, was dissolved in 8 ml. of water and acidified with 2.7 ml. 3 N hydrochloric acid. The resultant aqueous solution was extracted twice with 7 ml. chloroform. The chloroform extracts were combined and dried over sodium sulfate and then evaporated to an oil.

The product, monobenzyl phosphite in 20 ml. dry pyridine, 3.67 g. (.005 mole) of erythromycin A in 20 ml. dry pyridine, and 1.24 g. (.006 mole) of dicyclohexylcarbodiimide in 10 ml. dry pyridine were combined, mixed thoroughly, capped, and allowed to stand at room temperature for four days.

The solution was then filtered to remove the urea and subsequently evaporated at room temperature under reduced pressure. The residue was dissolved in a minimum of acetone and filtered. The filtrate was then diluted with a large excess of ether and the precipitate filtered.

$[\alpha]_D^{23°} = -54.2$ (MeOH, $c=1.5$).
UV: 258 m$\mu$ $\epsilon_m = 290$.
Bioassay—530 mcg./mg.

Calc. for $C_{44}H_{74}NO_{15}P$: P, 3.50. Found: P, 3.34.

Example 2.—Erythromycin A—2'-(phenyl phosphite)

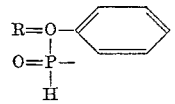

Monophenyl phosphite [1.06 g. (0.010 mole)], prepared by the process of F. C. Gunderloy, Jr., U.S. Patent 3,019,249, was dissolved in 50 ml. of pyridine. To this was added 7.34 g. (0.010 mole) of erythromycin A and 2.68 g. (0.012 mole) of dicyclohexylcarbodiimide. The solution was allowed to stand 6–7 days at room temperature. The urea was removed by filtration and the pyridine removed under reduced pressure. The residue was then dissolved in 30 ml. of acetone and the acetone solution slowly added to 400 ml. of ether. The precipitate thus formed was filtered and air dried. A white powder [3.7 g. (42%)] was obtained.

Biological assay 364 $\mu$/mg.
$[\alpha]_D^{25°} = -48.1°$.

Calc. for $C_{43}H_{72}NO_{15}P$: P, 3.55; N, 1.60. Found: P, 3.19; N, 1.80.

Example 3.—Erythromycin A—2'-(methyl phosphite)

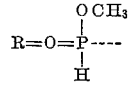

Erythromycin A [14.7 g. (0.020 mole)] and 2.26 g. (0.020 mole) of the ammonium salt of monomethyl phosphite, prepared by the procedure of Chadwick, U.S. Patent 2,834,797, were dissolved in 100 ml. of dry pyridine. To this solution was added a solution of 5.16 g. (0.024 mole) of dicyclohexylcarbodiimide dissolved in 40 ml. of pyridine. The resultant solution was stirred for 24 hours at room temperature. The urea was removed by filtration and the pyridine removed under reduced pressure. The residue was dissolved in a minimum of acetone and added to a large excess of ether. The precipitate was collected by filtration and air dried. A white solid [3.4 g. (21%)] was obtained.

Biological assay 496 $\mu$/mg.
$[\alpha]_D^{25°} = -58.3°$.

Calc. for $C_{38}H_{70}NO_{15}P$: P, 3.82; N, 1.73. Found: P, 3.10, 3.15; N, 2.26.

Example 4.—Erythromycin A—2'-(hydrogen phosphite)

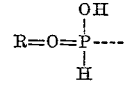

A solution of 2.0 g. of erythromycin A—2'(benzyl phosphite), prepared by the method of Example 1, in ethanol was hydrogenated over palladium on a carbon catalyst. The catalyst was removed by filtration and the solution evaporated at reduced pressure at 35° to a glass.

The dry product was stirred with dry ether for 1½ hours, then filtered and dried.

Yield=1.55 gm. (85.7%).
$[\alpha]_D^{23°}=-58.3$ (MeOH, c=1.5).
Solubility: water—5%.

Calc. for $C_{37}H_{68}NO_{15}P$: P, 3.88; N, 1.76. Found: P, 3.95; N, 1.82.

*Example 5.—Erythromycin A—2'-(hydrogen phosphite)*

As an alternative method to that illustrated in Example 4, the following method may be employed to prepare erythromycin A—2'-(hydrogen phosphite). A solution of 40 g. (.055 mole) of erythromycin A in 500 ml. acetone was combined with a solution of 4.1 g. (.05 mole) of phosphorous acid in 125 ml. pyridine. Twenty-five grams (0.112 mole) of dicyclohexylcarbodiimide was added to the mixture and stirred to complete solution.

The solution was stirred three days. The dicyclohexylurea was filtered and the filtrate was evaporated to an oil. The residue was then dissolved in 100 ml. methanol and precipitated by adding slowly to two liters of stirring ether. The sticky precipitate was triturated with fresh ether. It was then redissolved in methanol and precipitated with ether to yield 37.4 g. (93.8%) of material.

Biological assay: 490 mcg./mg.

Calc. for $C_{37}H_{68}NO_{15}P$: P, 3.88; N, 1.76. Found: P, 3.77; N, 1.71.

*Example 6.—Erythromycin A—2'-(dibenzyl phosphate)*

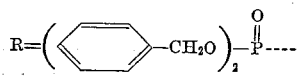

To a solution of 39.0 gm. (0.15 m.) of dibenzyl phosphite, prepared by the method found in J. Am. Chem. Soc., 76, 916 (1954), in 500 ml. dry benzene was added, in three portions, 21.0 g. (0.16 mole) of N-cholorsuccinimide with vigorous stiring. The temperature was held under 35° as the solution was stirred for two hours.

The succinimide was removed by filtration. The benzene was removed under reduced pressure at 30°, after which the solution was pumped at high vacuum for 45 minutes. Five hundred ml. of ether was added and the additional precipitate removed.

The ethereal solution of dibenzylphosphochloridate was added over a one-hour period to a solution of 73 g. (0.10 mole) of erythromycin A, 140 ml. of triethylamine, and 1500 ml. of ether, with the mixture being stirred for 3½ hours.

The sticky precipitate of triethylamine hydrochloride was removed and the solution kept at 4° overnight. The solution was then evaporated under reduced pressure to a glass, triturated with dry ether, filtered, and washed with fresh ether. The resultant amorphous solid product was crystallized from an acetone-$H_2O$ mixture.

Crude yield=94.4 g. (95%).
Crystallized yield=31.2 gm. (31.4%) as the pentahydrate.
$[\alpha]^{23°}=-32.1$ (MeOH, c=1.5).
Ultraviolet spectrum λ max=258 mμ, ε 598.
M.W.=994.

Calc. for $C_{51}H_{80}NO_{16}P \cdot 5H_2O$: C, 56.8; H, 8.30; P, 2.86. Found: C, 57.17; H, 8.43; P, 2.69.

*Example 7.—Erythromycin A—2'-(dihydrogen phosphate)*

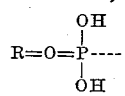

A solution of 40 g. of erythromycin A—2'-(dibenzyl phosphate), prepared by the method of Example 6, in ethanol was hydrogenated over a palladium catalyst with a theoretical uptake of hydrogen. The catalyst was removed by filtration and the solution was then evaporated under reduced pressure at 35° to a glass. The resultant dry material was first triturated with Skelly B solvent, then ether. The yield was 36.5 g. (99%) as the triethylamine salt. This salt crystallized from methanol-water to form the zwitterion.

*Example 8.—Erythromycin A—2'-(dihydrogen phosphate)*

As an alternative method to that illustrated in Example 7, the following method may be employed to prepare erythromycin A—2'-(dihydrogen phosphate).

To a solution of 8.14 g. (.01 mole) of erythromycin A phosphoric acid salt disolved in 75 ml. dry pyridine was added a solution of 4.5 g. (.02 mole) of dicyclohexylcarbodiimide dissolved in 25 ml. dry pyridine. The solution was capped and allowed to stand, being stirred occasionally, for four days.

The precipitated dicyclohexylurea was removed by filtration and the solution evaporated to an oil at 40° at reduced pressure. Fifty ml. of acetone was added and the excess dicyclohexylurea was filtered from the solution. The filtrate was then evaporated to about 10 ml. and added dropwise to 300 ml. of stirring ether. The resultant precipitate was filtered, washed with ether, and dried in a vacuum desiccator.

Yield=6.5 gm. (81.4%).
$[\alpha]_D^{23°}=-59.8$ (MeOH, c.=1.5).

Calc. for $C_{37}H_{68}NO_{16}P$: P, 3.81; N, 1.72. Found: P, 3.52; N, 1.92.

*Example 9.—Erythromycin A—2'-(diphenyl phosphate)*

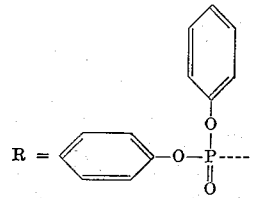

Into 250 ml. of dry ether and 28 ml. of triethylamine was dissolved 14.6 g. (0.020 mole) of erythromycin A. To the resultant solution was added 6.71 g. (0.025 mole) of diphenylphosphorochloridate dissolved in 50 ml. of dry ether. The solution was tirred for three hours, and then decanted from the gum. The solvent was removed under reduced pressure. The solid thus obtained was triturated first with ether and finally with Skelly B solvent. After filtering, 22 g. (56%) of white powder was obtained.

Biological activity: 555 μ/mg.
$[\alpha]_D^{25°}=-46.3°$.

Calc. for $C_{49}H_{76}NO_{16}P$: N, 1.45; P, 3.2. Found: N, 1.68, 1.70; P, 3.73.

*Example 10.—Erythromycin A—2'-(dimethyl phosphate)*

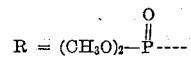

Erythromycin A [14.7 g. (0.020 mole)] was dissolved in 100 ml. dry pyridine. Dimethyl phosphonic acid [2.62 g. (0.020+ mole)] dissolved in 50 ml. of dry pyridine was added. The solution was stirred and 10.4 g. (0.50 mole) of dicyclohexylcarbodiimide added and the solution stirred for 24 hours at room temperature. The urea was filtered and the solution evaporated to a volume of 50 ml. The solution was then added to 1200 ml. of ether. The precipitate thus formed was filtered and triturated with ether. A white powder [4.37 g. (25%)] was obtained.

Biological activity: 467 μ/mg.
$[\alpha]_D^{25°}=-30.5°$.

Calc. for $C_{39}H_{72}NO_{16}P$: P, 3.68; N, 1.66. Found: P, 3.70; N, 2.39.

*Example 11.—Erythromycin A—2'-(dimethyl phosphate)*

As an alternative method to that illustrated in Example 10, the following method may be employed to prepare erythromycin A-T'-(dimethyl phosphate). Dimethyl phosphite [1.65 g. (0.015 mole)] was dissolved in 50 ml. of dry benzene. N-chlorosuccinimide [2.1 g. (0.016 mole)] was added and the resulting solution was then stirred for two hours. The solution was then filtered and the benzene removed under reduced pressure. The residue was dissolved in 50 ml. of dry ether. The ether solution was slowly added to a stirring solution of 7.3 g. (0.010 mole) of erythromycin, 7 ml. (0.05 mole) of triethylamine and 100 ml. of ether, and stirring was continued for 3½ hours at room temperature. The triethylamine hydrochloride was removed by filtration and the solvent removed at reduced pressure. The solid was triturated with ether.

Biological assay: 570 µ/mg.

*Example 12.—Erythromycin A—2'-(diethyl phosphate)*

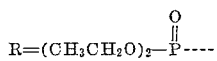

Erythromycin A [7.3 g. (0.010 mole)] and 7 ml. (0.050 mole) of triethylamine were dissolved in 125 ml. of ether. Diethylphosphorochloridate [2.59 g. (0.015 mole)] in 25 ml. of dry ether was added dropwise with stirring. The solution was stirred for 2½ hours, and then decanted from the gummy precipitate. After stripping off the solvent at reduced pressure, the resulting glass was triturated with ether yielding 5.2 g. (60%).

Biological activity: 646 µ/mg.
$[\alpha]_D^{25°} = -26.8°$.

Therapeutic compositions containing the phosphate and phosphite ester derivatives of the present invention and suitable for oral administration can be prepared by combining a selected ester derivative with a pharmaceutically-acceptable medium in a manner well known in the art. Dosage amounts generally follow the present usage of erythromycin. A pharmaceutical embodiment comprising a therapeutically-active solution of said erythromycin phosphate and phosphite ester derivatives may be prepared by mixing a selected ester derivative with a pharmaceutically-acceptable carrier such as polyethylene glycol or water. Such a composition may be administered intramuscularly by means of a hypodermic needle in the conventional manner.

Others may practice the invention in any of the numerous ways which will be suggested by this disclosure to one skilled in the art. All such practices of the invention are considered to be a part thereof provided they fall within the scope of the appended claims.

What is claimed is:
1. A compound having the formula:

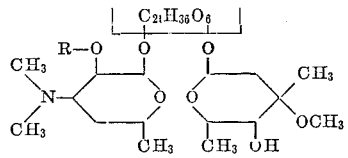

wherein R is selected from the group consisting of hydrogen phosphite, loweralkyl phosphite, aryl phosphite, dihydrogen phosphate, diloweralkyl phosphate, and diaryl phosphate.

2. A compound as claimed in claim 1 wherein R is hydrogen phosphite.

3. A compound as claimed in claim 1 wherein R is dihydrogen phosphate.

4. A compound as claimed in claim 1 wherein R is benzyl phosphite.

5. A compound as claimed in claim 1 wherein R is phenyl phosphite.

6. A compound as claimed in claim 1 wherein R is methyl phosphite.

7. A compound as claimed in claim 1 wherein R is dibenzyl phosphate.

8. A compound as claimed in claim 1 wherein R is diphenyl phosphate.

9. A compound as claimed in claim 1 wherein R is dimethyl phosphate.

10. A compound as claimed in claim 1 wherein R is diethyl phosphate.

References Cited

UNITED STATES PATENTS

| | | | |
|---|---|---|---|
| 2,894,943 | 7/1959 | Nelson et al. | 260—210 |
| 3,121,714 | 2/1964 | Gollaher et al. | 260—210 |
| 3,276,956 | 10/1966 | Cardinal | 260—210 |

LEWIS GOTTS, *Primary Examiner.*

J. R. BROWN, *Assistant Examiner.*